United States Patent
Lin et al.

(10) Patent No.: US 11,119,646 B2
(45) Date of Patent: Sep. 14, 2021

(54) ELECTRONIC DEVICE AND CONTROL METHOD

(71) Applicant: Chiun Mai Communication Systems, Inc., New Taipei (TW)

(72) Inventors: Yen-Hui Lin, New Taipei (TW); Sung-Chieh Chang, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 16/543,007

(22) Filed: Aug. 16, 2019

(65) Prior Publication Data

US 2020/0057543 A1 Feb. 20, 2020

(30) Foreign Application Priority Data

Aug. 17, 2018 (CN) .......................... 201810940980.1

(51) Int. Cl.
*G06F 3/0488* (2013.01)
*G06F 3/0481* (2013.01)
*G06F 3/0483* (2013.01)
*G06F 3/01* (2006.01)
*G06F 21/32* (2013.01)

(52) U.S. Cl.
CPC ............ *G06F 3/0488* (2013.01); *G06F 3/013* (2013.01); *G06F 3/0483* (2013.01); *G06F 3/04817* (2013.01); *G06F 21/32* (2013.01)

(58) Field of Classification Search
CPC .... G06F 3/0488; G06F 3/013; G06F 3/04817; G06F 3/0483; G06F 21/32
See application file for complete search history.

(56) References Cited

U.S. PATENT DOCUMENTS

| | | | | |
|---|---|---|---|---|
| 7,292,290 B2* | 11/2007 | Miyagawa | ............ | G06F 1/1601 349/58 |
| 7,463,325 B2* | 12/2008 | Oohira | ............ | G02F 1/133615 349/149 |
| 7,796,206 B2* | 9/2010 | Hiradate | ................ | H05K 5/02 349/58 |
| 9,223,483 B2* | 12/2015 | Thorsander | ......... | G06F 3/04842 |
| 9,256,351 B2* | 2/2016 | Andersson Reimer | | ...................... G06F 3/0482 |
| 9,335,920 B2* | 5/2016 | Ohashi | ............... | H04N 21/4622 |
| 9,450,957 B1* | 9/2016 | Daniel | ................... | G06F 3/0486 |
| 10,057,400 B1* | 8/2018 | Gordon | ............. | G06Q 30/0269 |
| 10,165,108 B1* | 12/2018 | Douglas | .............. | H04L 63/0861 |
| 10,271,425 B1* | 4/2019 | Hassemer | ............. | G06F 3/0443 |

(Continued)

FOREIGN PATENT DOCUMENTS

| CN | 105204904 | 12/2015 |
|---|---|---|
| CN | 206209868 | 5/2017 |

(Continued)

*Primary Examiner* — Sejoon Ahn
(74) *Attorney, Agent, or Firm* — ScienBiziP, P.C.

(57) ABSTRACT

An electronic device includes a first screen, a second screen, and a controller. The first screen displays a number of icons and detects touch operations. Each of the icons corresponds to a different user interface. The controller starts up the second screen and control the second screen to display the corresponding user interface of a selected one of the icons selected by a touch operation. The second screen is in a turned off state prior to being started up by the controller.

17 Claims, 8 Drawing Sheets

(56) References Cited

U.S. PATENT DOCUMENTS

| | | | | |
|---|---|---|---|---|
| 2005/0233611 | A1* | 10/2005 | Sung | G02F 1/13452 |
| | | | | 439/67 |
| 2009/0178008 | A1* | 7/2009 | Herz | G06F 3/0483 |
| | | | | 715/840 |
| 2009/0276702 | A1* | 11/2009 | Bamford | G06F 3/0485 |
| | | | | 715/702 |
| 2010/0001967 | A1* | 1/2010 | Yoo | G06F 3/04842 |
| | | | | 345/173 |
| 2013/0332856 | A1* | 12/2013 | Sanders | G06F 3/0481 |
| | | | | 715/753 |
| 2015/0015511 | A1* | 1/2015 | Kwak | G06F 1/1643 |
| | | | | 345/173 |

FOREIGN PATENT DOCUMENTS

| | | |
|---|---|---|
| CN | 207082116 | 3/2018 |
| CN | 108170251 | 6/2018 |
| TW | 200905578 | 2/2009 |
| TW | 201804362 | 2/2018 |

\* cited by examiner

ELECTRONIC DEVICE AND CONTROL METHOD

FIELD

The subject matter herein generally relates to electronic devices, and more particularly to an electronic device implementing a control method.

BACKGROUND

Generally, when an electronic device is started up from a locked state, the electronic device displays a same user interface. In order to select an application to execute, the application must be selected on the user interface.

BRIEF DESCRIPTION OF THE DRAWINGS

Implementations of the present disclosure will now be described, by way of example only, with reference to the attached figures.

DETAILED DESCRIPTION

Figure 1:
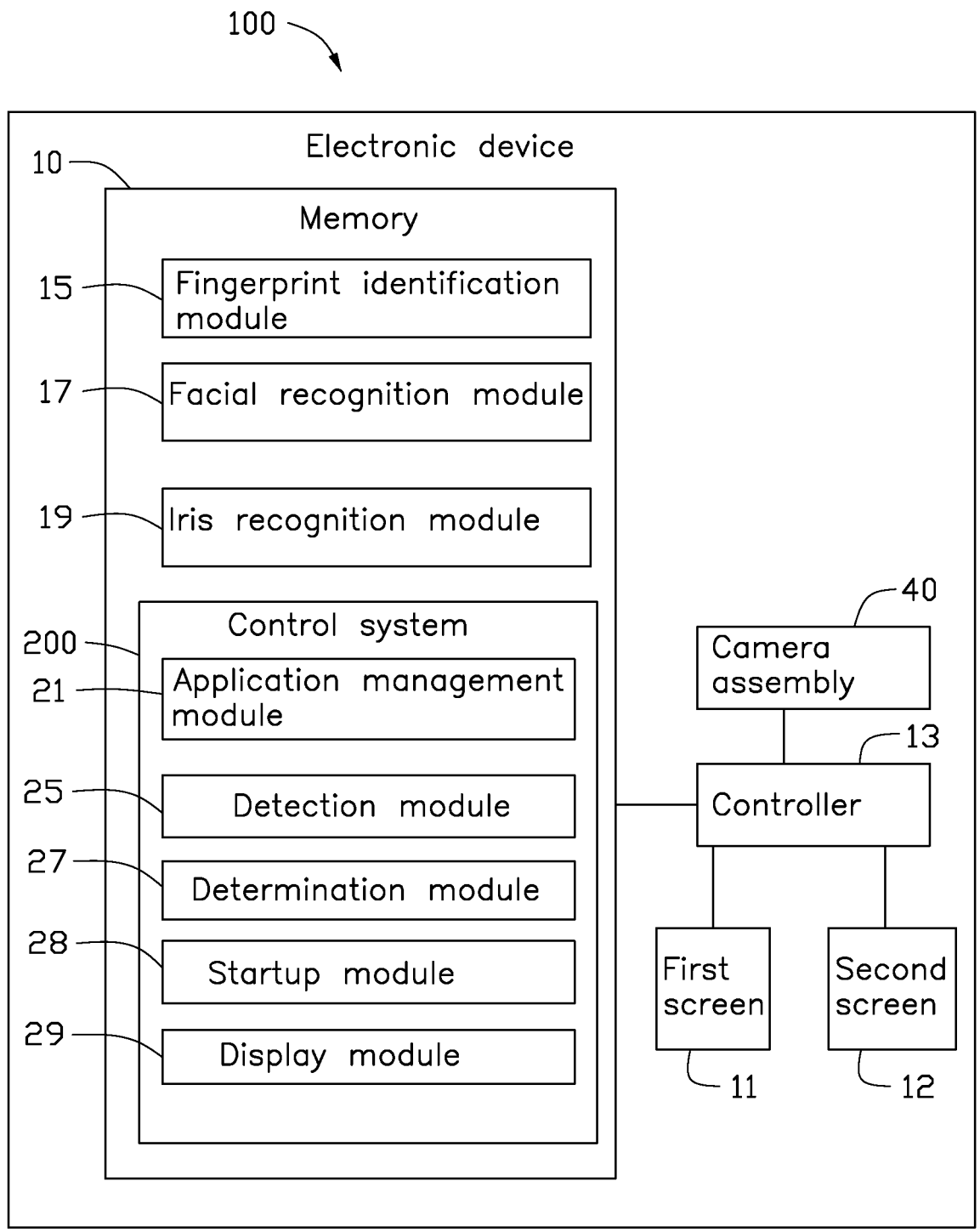
FIG. 1 is a block diagram of an electronic device in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
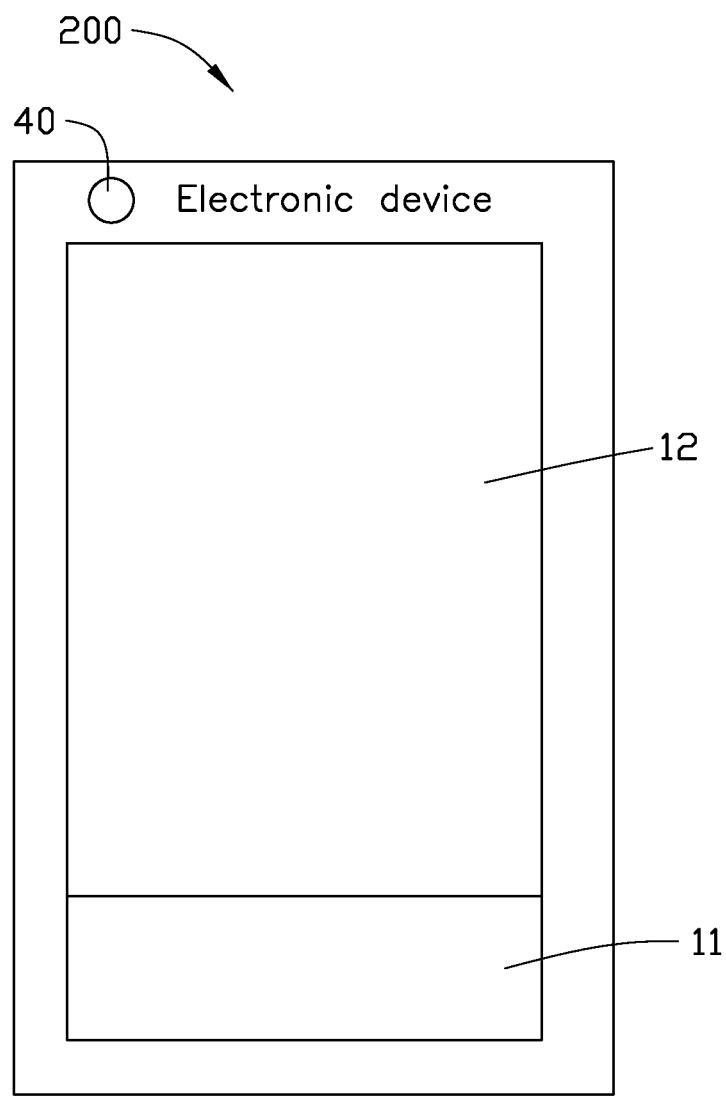
FIG. 2 is a diagram of a first screen and a second screen of the electronic device.

FIG. 1 and FIG. 2 show an embodiment of an electronic device 100. The electronic device 100 may be, but is not limited to, a tablet computer, a smart mobile phone, or a personal digital assistant.

The electronic device 100 includes a memory 10, a first screen 11, a second screen 12, a controller 13, and a camera assembly 40.

The memory 10 may be an internal memory of the electronic device 100 or may be an external memory, such as a smart media card, a secure digital card, a flash card, or the like. The memory 10 stores a fingerprint identification module 15, a facial recognition module 17, and an iris recognition module 19. The fingerprint identification module 15, the facial recognition module 17, and the iris recognition module 19 are a collection of instructions executed by the controller 13.

The controller 13 may be a central processing unit, a microprocessing unit, or other digital processing chip.

In one embodiment, the first screen 11 and the second screen 12 are touch screens. The first screen 11 may be a liquid crystal, OLED, micro LED, or electronic paper screen. The second screen 12 may be a liquid crystal, OLED, or micro LED screen.

The first screen 11 may be mounted on a front surface, a side surface, or a back surface of the electronic device 100. The first screen 11 may also be mounted on a housing of the electronic device 100 (not shown). The second screen 12 is mounted on the front surface of the electronic device 100.

Figure 3A:
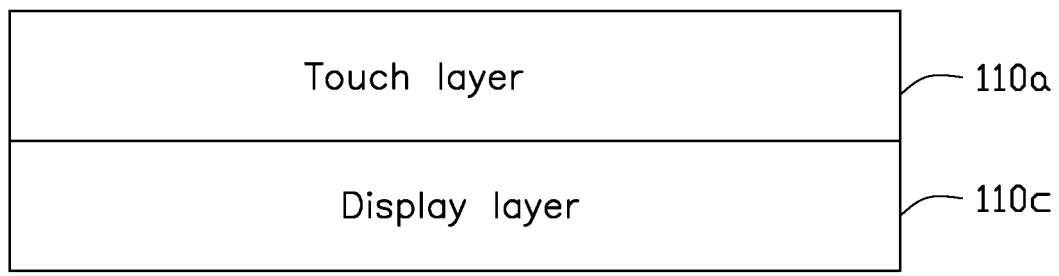
FIG. 3A is a diagram of an embodiment of the first screen in FIG. 2.

In one embodiment, as shown in FIG. 3A, the first screen 11 includes a display layer 110c and a touch layer 110a. The touch layer 110a is layered on top of the display layer 110c. The touch layer 110a detects touch gestures on the first screen 11. The display layer 110c may be a liquid crystal, OLED, micro LED, or electronic paper screen for displaying a plurality of icons. Each of the plurality of icons corresponds to a user interface. The plurality of icons include a desktop icon. The user interface corresponding to the desktop icon is a desktop of an operating system of the electronic device 100. The plurality of icons further include at least one icon of an application. The icon of the application corresponds to a user interface of the application. The controller 13 starts up the second screen 12 in response to a touch operation on the first screen 11 selecting one of the icons and control the second screen 12 to display the user interface of the selected icon.

Figure 3B:
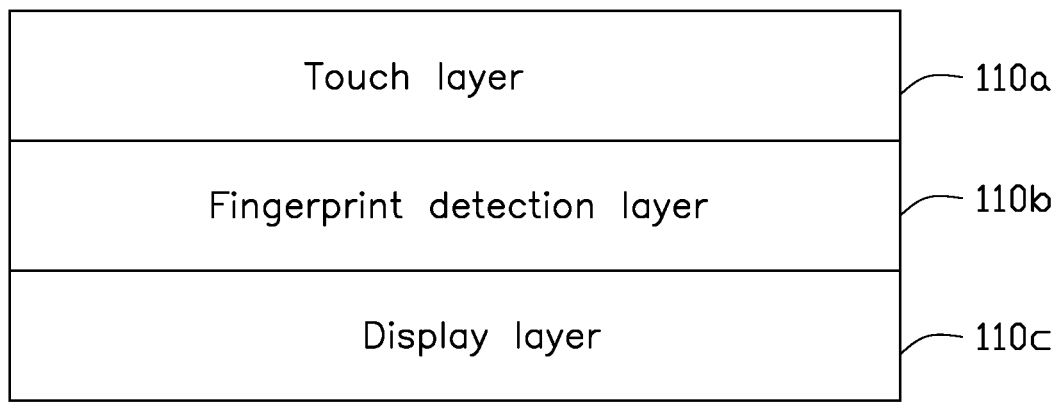
FIG. 3B is a diagram of another embodiment of the first screen in FIG. 2.

In another embodiment, as shown in FIG. 3B, the first screen 11 includes a display layer 110c, a touch layer 110a, and a fingerprint detection layer 110b. The touch layer 110a detects touch operations on the first screen 11. The fingerprint detection layer 110b detects a fingerprint of a user and sends the fingerprint to the controller 13. The display layer 110c may be a liquid crystal, OLED, micro LED, or electronic paper display for displaying the plurality of icons. Each of the plurality of icons corresponds to a user interface. The touch layer 110a may be layered on top of the fingerprint detection layer 110b, and the fingerprint detection layer 110b may be layered on top of the display layer 110c. In other embodiments, the fingerprint detection layer 110b and the touch layer 110a may be integrally formed as a single layer and layered over the display layer 110c. The controller 13 starts up the second screen 12 in response to a touch operation selecting one of the icons and control the second screen 12 to display the corresponding user interface of the icon.

In one embodiment, the plurality of icons displayed by the first screen 11 include icons of applications. Each of the icons of applications corresponds to a user interface of the application. The icons displayed correspond to the most frequently used applications of the electronic device 100. In another embodiment, the controller 13 displays icons of applications having pending events on a priority position of the first screen 11. The pending events include unanswered calls, unread messages, unread emails, and unread notifications.

The first screen 11 displays a first graphical interface, and the second screen 12 displays a second graphical interface. In one embodiment, the first screen 11 and the second screen 12 are mounted adjacent to each other on a same surface of the electronic device 100, such that the first graphical interface and the second graphical interface cooperatively form a whole graphical interface. In other embodiments, the first screen 11 and the second screen 12 are mounted on different surfaces of the electronic device 100, such that the first graphical interface and the second graphical interface are independent of each other. Both the first and the second graphical interfaces include icons of applications and a user interface of the applications. The icons of the applications are icons provided by the operating system to allow a user to select to execute. In one embodiment, the first graphical interface displayed by the first screen 11 displays the icons of the applications, and the second graphical interface of the second screen 12 displays the user interface of the applications.

The camera assembly 40 may be a camera for capturing facial characteristics and/or iris characteristics and sending the captured facial characteristics/iris characteristics to the controller 13.

The fingerprint identification module 15 obtains the fingerprint of a user through the fingerprint detection layer 110b and determines whether the fingerprint matches a stored fingerprint in the memory 10. The facial recognition module 17 obtains the facial characteristics captured by the camera assembly 40 and determines whether the facial characteristics match stored facial characteristics in the memory 10. The iris recognition module 19 obtains the iris characteristics captured by the camera assembly 40 and determines whether the iris characteristics match stored iris characteristics in the memory 10. In other embodiments, the electronic device 100 may only include the fingerprint identification module 15, the facial recognition module 17, or the iris recognition module 19, or may only include the facial recognition module 17 and the iris recognition module 19.

A control system 200 is installed in the electronic device 100. The memory 10 stores the control system 200 and related data, such as biographical information of a user and the stored characteristics. The biographical information may be a fingerprint or facial characteristics and/or iris characteristics. The control system 200 includes a plurality of modules, which are a collection of instructions stored in the memory 10 and executed by the controller 13 to perform functions of the modules. The control system 200 includes an application management module 21, a detection module 25, a determination module 27, a startup module 28, and a display module 29.

The application management module 21 manages the plurality of applications. For example, the application management module 21 records a frequency of usage of the applications, whether the applications have pending events, and the like.

The detection module 25 detects touch operations on the first screen 11. The touch operations may be a long press, a short press, a sliding touch, or the like.

The determination module 27 determines, according to the fingerprint identification module 15, the facial recognition module 17, and the iris recognition module 19, whether the biographical information matches stored biographical information.

The startup module 28 starts up the second screen 12 in response to a touch operation on the first screen 11 selecting an icon of an application. The second screen 12 is in a turned off state prior to being started up. The turned off state is when the second screen 12 does not emit light or display any graphical interface. The startup module 28 may also start up the camera assembly 40.

The display module 29 controls the second screen 12 to display the user interface corresponding to the selected icon of the application.

Figure 4:
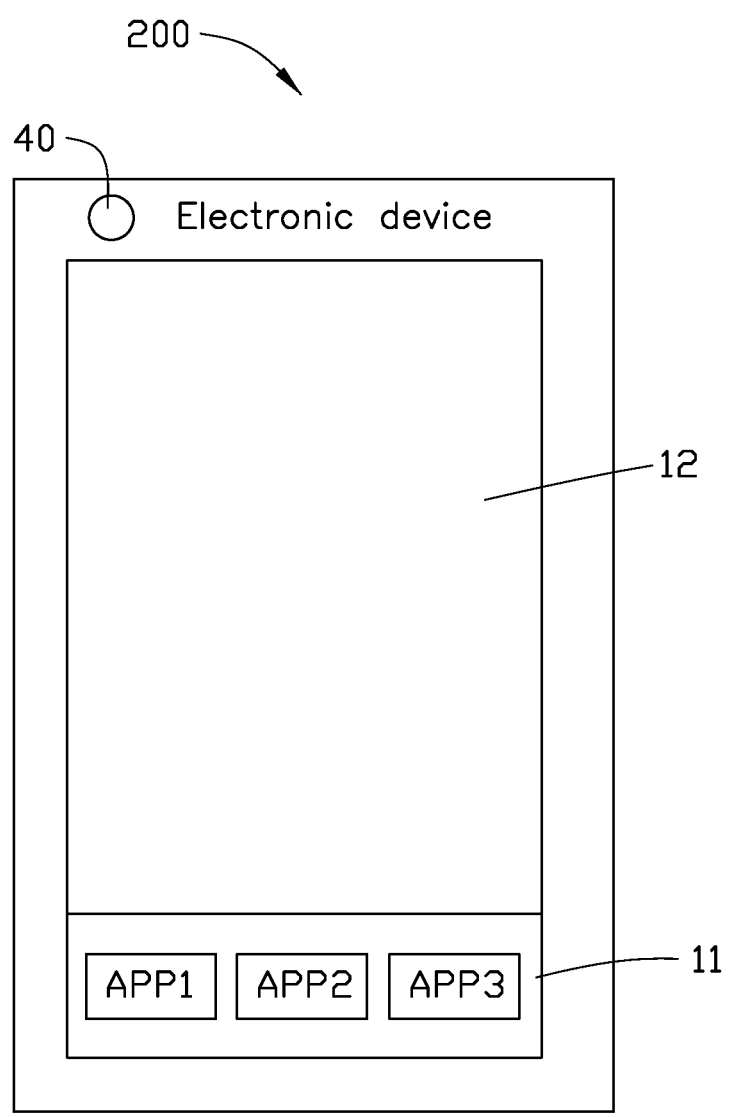
FIG. 4 is another diagram of the first screen and the second screen of the electronic device.

As shown in FIG. 4, the first screen 11 displays a plurality of icons. The plurality of icons include at least one icon of an application. The user interface corresponding to each of the plurality of icons is a user interface of the application of the icon. In one embodiment, the plurality of icons include icons of APP1, APP2, and APP3. The detection module 25 detects a touch operation on the icons of APP1, APP2, and APP3. For example, when a user applies a touch operation on the icon of APP1, the detection module 25 detects the touch operation on the icon of APP1, the fingerprint identification module 15 obtains the fingerprint applied on the icon of APP1 from the fingerprint detection layer 110b, and the determination module 27 determines according to the fingerprint identification module 15 whether the fingerprint matches the stored fingerprint in the memory 10. When the fingerprint matches the stored fingerprint, the startup module 28 initiates an unlocking procedure to unlock the electronic device 100 and execute the application of APP1. The electronic device 100 is in a locked state prior to being unlocked.

In another embodiment, the plurality of icons further include a desktop icon corresponding to a desktop of the operating system of the electronic device 100. When the user applies a touch operation on the desktop icon and the determination module 27 determines that the fingerprint matches the stored fingerprint in the memory 10, the startup module 28 unlocks the electronic device 100, and the display module 29 controls the second screen 12 to display the desktop of the electronic device 100.

Figure 5:
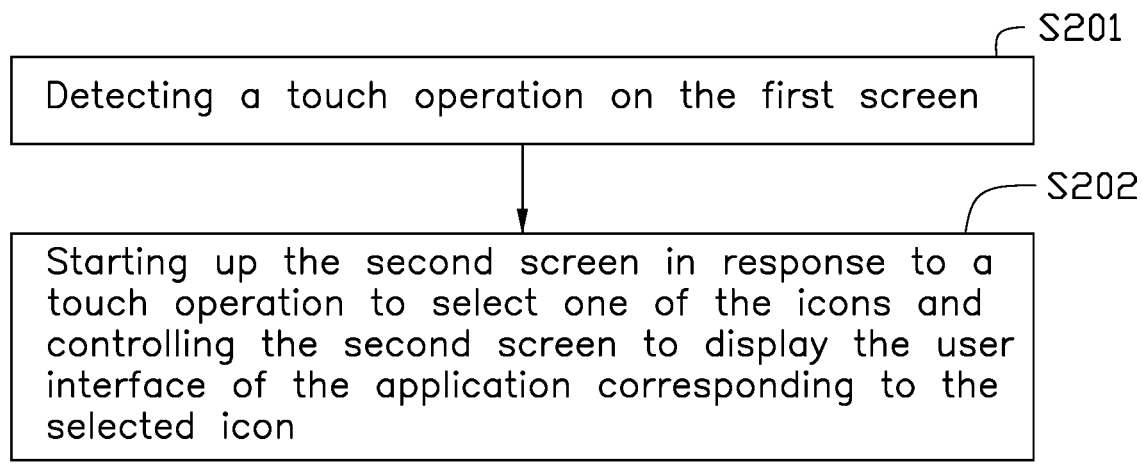
FIG. 5 is a flowchart of an embodiment of a control method implemented in an electronic device.

FIG. 5 illustrates a flowchart of a control method implemented in an electronic device 100. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S201.

At block S201, a touch operation is detected on the first screen 11. The second screen 12 is in a turned off state.

In one embodiment, the first screen 11 includes a display layer 110c and a touch layer 110a. The touch layer 110a detects touch gestures on the first screen 11. The display layer 110c displays a plurality of icons. Each of the plurality of icons corresponds to a user interface. The plurality of icons include a desktop icon. The user interface corresponding to the desktop icon is a desktop of an operating system of the electronic device 100. The plurality of icons further include at least one icon of an application. The icon of the application corresponds to a user interface of the application. The controller 13 starts up the second screen 12 in response to a touch operation selecting one of the icons and control the second screen 12 to display the user interface of the selected icon.

At block S202, the second screen 12 is started up in response to a touch operation to select one of the icons and controlled to display the user interface of the application corresponding to the selected icon.

When the desktop icon is selected, the startup module 28 starts up the second screen 12, and the display module 29 controls the second screen 12 to display the user interface of the desktop of the operating system of the electronic device 100.

When the icon of an application is selected, the startup module 28 starts up the second screen 12, and the display module 29 controls the second screen 12 to display the user interface of the application of the icon.

Figure 6:
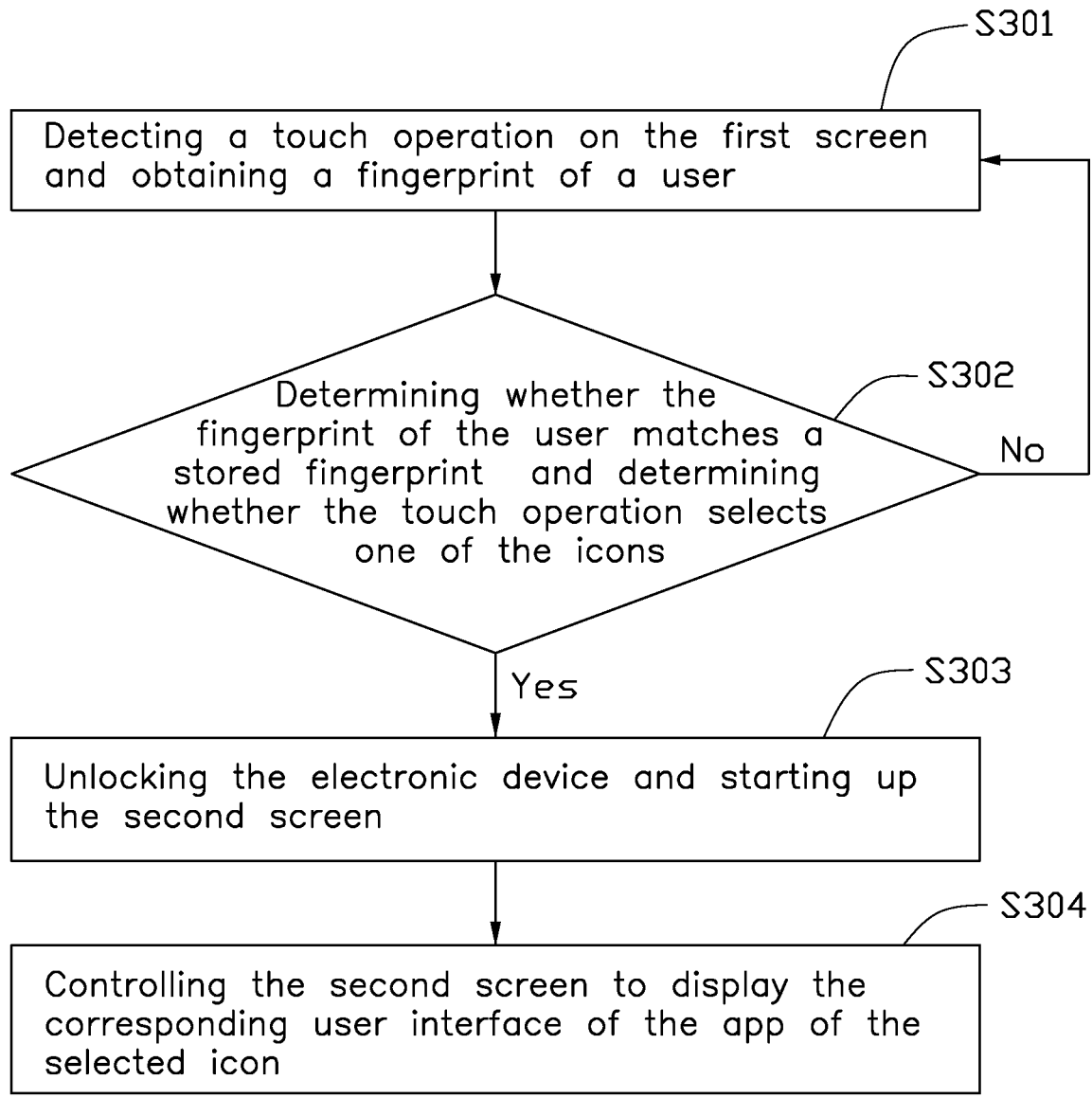
FIG. 6 is a flowchart of another embodiment of a control method implemented in an electronic device.

FIG. 6 illustrates a flowchart of another embodiment of a control method implemented in the electronic device 100. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S301.

At block S301, a touch operation is detected on the first screen 11, and a fingerprint of a user is obtained. The second screen 12 is in a turned off state, and the electronic device 100 is in a locked state.

In one embodiment, the first screen 11 includes a display layer 110c, a touch layer 110a, and a fingerprint detection layer 110b. The touch layer 110a detects touch operations on the first screen 11. The fingerprint detection layer 110b detects a fingerprint of a user. The display layer 110c displays the plurality of icons. When a user applies a touch operation on the first screen 11 to select an icon, the detection module 25 detects the touch operation from the touch layer 110a, and the fingerprint detection layer 110b detects and obtains the fingerprint of the user.

At block S302, the determination module 27 determines from the fingerprint identification module 15 whether the fingerprint of the user matches a stored fingerprint in the memory 10, and the determination module 27 determines whether the touch operation selects one of the plurality of icons. When the fingerprint does not match the stored fingerprint or when the touch operation does not select one of the icons, the determination module 27 ignores the touch operation, and block S301 is repeated. When the fingerprint matches the stored fingerprint and when the touch operation selects one of the icons, block S303 is implemented.

At block S303, the startup module 28 unlocks the electronic device 100 and starts up the second screen 12.

At block S304, the display module 29 controls the second screen 12 to display the corresponding user interface of the selected icon.

Figure 7:
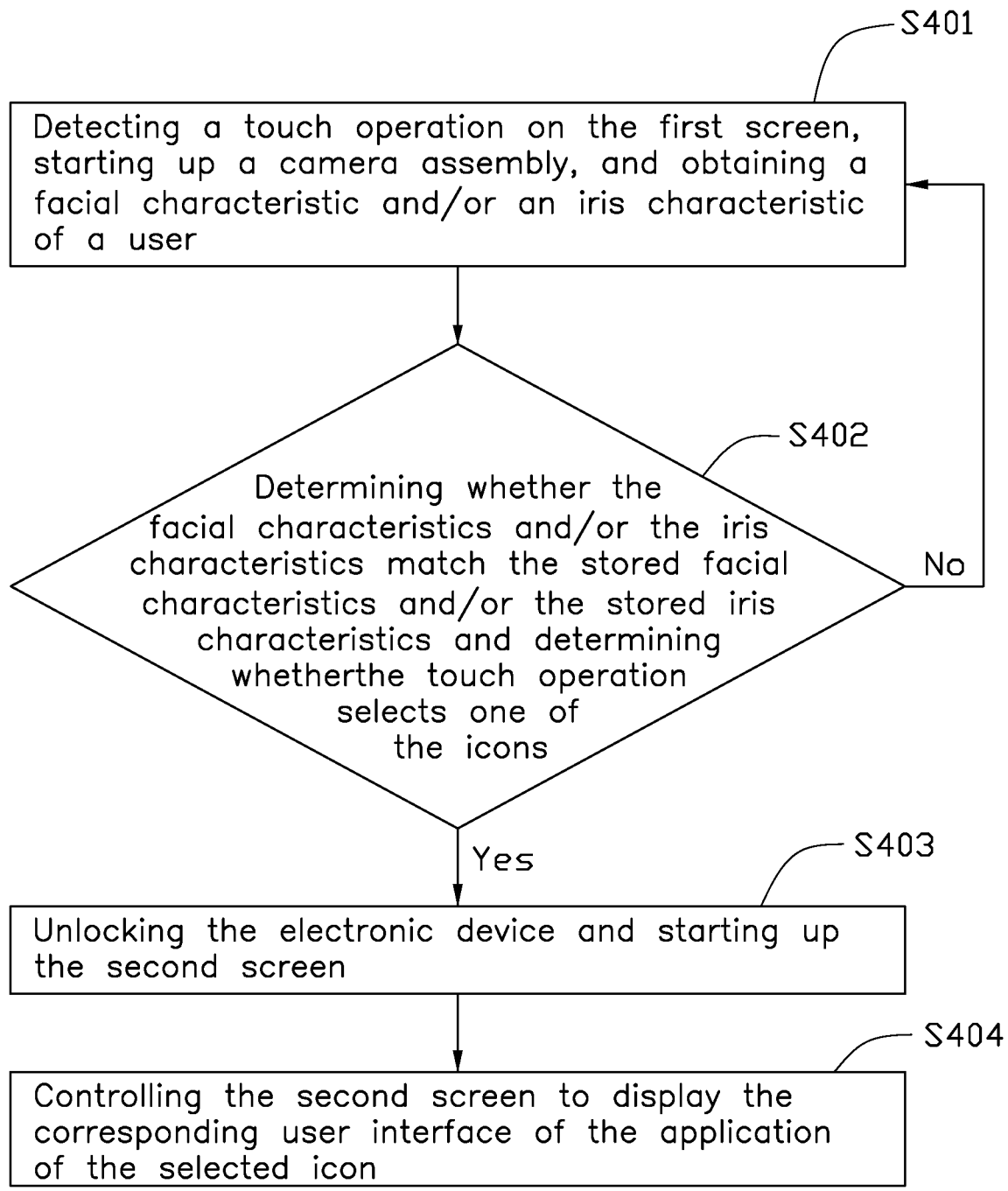
FIG. 7 is a flowchart of another embodiment of a control method implemented in an electronic device.

FIG. 7 illustrates a flowchart of another embodiment of a control method implemented in the electronic device 100. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 7 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S401.

At block S401, a touch operation is detected on the first screen 11, a camera assembly 40 is started up, and a facial characteristic and/or an iris characteristic of a user is obtained. The second screen 12 is in a turned off state, and the electronic device 100 is in a locked state.

In one embodiment, the first screen 11 includes a display layer 110c and a touch layer 110a. The touch layer 110a detects touch operations on the first screen 11. The display layer 110c displays the plurality of icons. When a user applies a touch operation on the first screen 11 to select an icon, the detection module 25 detects the touch operation from the touch layer 110a. The startup module 28 starts up the camera assembly 40, and the facial recognition module 17 and/or the iris recognition module 19 obtains the facial characteristics and/or the iris characteristics captured by the camera assembly 40.

At block S402, the determination module 27 determines according to the facial recognition module 17 and/or the iris recognition module 19 whether the facial characteristics and/or the iris characteristics match the stored facial characteristics and/or the stored iris characteristics, and further determines whether the touch operation selects one of the icons. When the facial characteristics and/or the iris characteristics do not match the stored facial characteristics and/or the stored iris characteristics or the touch operation does not select one of the icons, the determination module 27 ignores the touch operation, and block S401 is repeated. When the facial characteristics and/or the iris characteristics match the stored facial characteristics and/or the stored iris characteristics and the touch operation selects one of the icons, block S403 is implemented.

At block S403, the startup module 28 unlocks the electronic device 100 and starts up the second screen 12.

At block S404, the display module 29 controls the second screen 12 to display the corresponding user interface of the application of the selected icon.

In one embodiment, the startup module 28 controls the electronic device 100 to switch to the locked state and controls the second screen 12 to switch to the turned off state after a predetermined length of time of the electronic device 100 remaining idle. When the second screen 12 is switched to the turned off state, the first screen 11 continues to display the plurality of icons. When the first screen 11 is not an electronic ink display, the first screen 11 continues to display the plurality of icons.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
a first screen configured to display a plurality of icons and detect touch operations, each of the plurality of icons corresponding to a corresponding one of a plurality of user interfaces;
a second screen; and
a controller configured to start up the second screen in a turned off state and control the second screen to display the corresponding user interface when one of the plurality of icons is selected by a touch operation on the first screen; wherein:
the first screen comprises a display layer and a touch layer, the display layer continues to display the plurality of icons when the second screen is in the turned off state, the touch layer is configured to detect the touch operations;
wherein the controller further obtains biographic information of a user and determines whether the obtained biographic information matches stored biographic information in a memory of the electronic device; when the obtained biographic information does not match the stored biographic information, the controller ignores the touch operations; when the obtained biographic information matches the stored biographic information, the controller unlocks the electronic device, starts up the second screen, and controls the second screen to display the corresponding user interface of the icon selected by the touch operation; the electronic device is in a locked state prior to being unlocked.

2. The electronic device of claim 1, wherein the plurality of icons comprises a desktop icon, and the corresponding user interface of the desktop icon is a desktop of an operating system of the electronic device.

3. The electronic device of claim 1, wherein the plurality of icons comprises at least one icon of an application; the corresponding user interface of the at least one icon of an application is a user interface of the application; the controller starts up the second screen and controls the second screen to display the user interface of the application when the icon of the application is selected by the touch operations.

4. The electronic device of claim 3, wherein the at least one icon of an application comprises a plurality of icons of a plurality of applications; each of the plurality of icons corresponds to an application; the plurality of icons of the plurality of applications correspond to the most frequently used applications of the electronic device.

5. The electronic device of claim 3, wherein the controller further displays icons of applications having pending events on a priority position of the first screen; the pending events comprise unanswered calls, unread messages, unread emails, and unread notifications.

6. The electronic device of claim 1, wherein the biographic information comprises a fingerprint; the first screen further comprises a fingerprint detection layer; the fingerprint detection layer detects a fingerprint of a user and sends the fingerprint to the controller.

7. The electronic device of claim 1, wherein the biographic information comprises facial characteristics and/or iris characteristics; the electronic device further comprises a camera assembly; the camera assembly captures images of the biographic information of the user and sends the captured images to the controller.

8. The electronic device of claim 1, wherein the controller further controls the electronic device to switch to the locked state after a predetermined length of time of the electronic device remaining idle.

9. The electronic device of claim 1, wherein the controller further controls the second screen to switch to the turned off state after a predetermined length of time of the electronic device remaining idle; the first screen displays the plurality of icons when the second screen is in the turned off state.

10. The electronic device of claim 1, wherein the first screen is mounted on a front surface, a side surface, a back surface, or on a housing of the electronic device; the second screen is mounted on the front surface of the electronic device.

11. A control method implemented in an electronic device, the electronic device comprising a first screen and a second screen, the first screen comprising a display layer and a touch layer, the control method comprising:
continuing to display a plurality of icons on the display layer when the second screen is in a turned off state and detecting a touch operation on the touch layer, the plurality of icons corresponding to a plurality of user interfaces;
starting up the second screen in the turned off state when one of the plurality of icons is selected by a touch operation on the first screen; and controlling the second screen to display the corresponding user interface of the selected icon;
the control method further comprising:
obtaining biographic information of a user and determining whether the obtained biographic information matches stored biographic information in a memory of the electronic device;
ignoring the touch operation when the obtained biographic information does not match the stored biographic information; and
starting up the second screen when the obtained biographic information matches the stored biographic information and controlling the second screen to display the corresponding user interface when one icon is selected by the touch operation; wherein:
the electronic device being in a locked state prior to being unlocked.

12. The control method of claim 11, wherein the plurality of icons comprises a desktop icon, and the corresponding user interface of the desktop icon is a desktop of an operating system of the electronic device.

13. The control method of claim 11, wherein the plurality of icons comprises at least one icon of an application; the corresponding user interface of the at least one icon of an application is a user interface of the application, the at least one icon of an application comprises icons of a plurality of applications; each icon corresponds to an application; the icons of the plurality of applications correspond to the most frequently used applications of the electronic device, the control method further comprising:
starting up the second screen when the at least one icon of an application is selected by the touch operation, executing the application, and controlling the second screen to display the user interface of the application.

14. The electronic device of claim 1, wherein an area of the first screen is smaller than an area of the second screen.

15. The control method of claim 11, wherein an area of the first screen is smaller than an area of the second screen.

16. The electronic device of claim 1, wherein the first screen is an electronic paper screen, the second screen is a liquid crystal, OLED, or micro LED screen.

17. The electronic device of claim 11, wherein the first screen is an electronic paper screen, the second screen is a liquid crystal, OLED, or micro LED screen.

\* \* \* \* \*